United States Patent
Erdmann et al.

(10) Patent No.: US 6,443,696 B1
(45) Date of Patent: Sep. 3, 2002

(54) EXHAUST GAS TURBOCHARGER TURBINE

(75) Inventors: Wolfgang Erdmann; Carsten Funke, both of Stuttgart; Thomas Hardt, Weinstadt; Paul Löffler, Stuttgart; Erwin Schmidt, Baltmannsweiler; Siegfried Sumser, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/673,329

(22) PCT Filed: Mar. 26, 1999

(86) PCT No.: PCT/EP99/02079

§ 371 (c)(1),
(2), (4) Date: Oct. 12, 2000

(87) PCT Pub. No.: WO99/53180

PCT Pub. Date: Oct. 21, 1999

(30) Foreign Application Priority Data

Apr. 15, 1998 (DE) .......................................... 198 16 645

(51) Int. Cl.⁷ ............................................... F01D 17/16
(52) U.S. Cl. ........................... 415/157; 415/150; 60/602
(58) Field of Search ................................. 415/150, 157, 415/158, 167; 60/602

(56) References Cited

U.S. PATENT DOCUMENTS

| | | | | |
|---|---|---|---|---|
| 4,984,965 A | * | 1/1991 | McKean ..................... | 415/157 |
| 5,214,920 A | * | 6/1993 | Leavesley ................... | 60/602 |
| 5,267,829 A | * | 12/1993 | Schmidt et al. ............. | 415/157 |
| 5,441,383 A | * | 8/1995 | Dale et al. ................... | 415/158 |
| 5,868,552 A | * | 2/1999 | McKean et al. ............. | 415/158 |
| 5,941,684 A | * | 8/1999 | Parker ......................... | 415/158 |
| 6,224,333 B1 | * | 5/2001 | Loeffler et al. ............. | 415/158 |

FOREIGN PATENT DOCUMENTS

| | | | | |
|---|---|---|---|---|
| DE | 39 43 705 A1 | 10/1989 | | |
| DE | 42 32 400 C1 | 9/1992 | | |
| DE | 4215301 A1 | * 11/1993 | .................. | 60/602 |
| DE | 4315474 C1 | * 9/1994 | .................. | 415/158 |
| DE | 195 43 190 A1 | 11/1995 | | |
| EP | 34915 A1 | * 9/1981 | .................. | 415/158 |
| EP | 0678657 A2 | 5/1989 | | |
| GB | 2031069 A | 9/1979 | | |
| WO | WO-98/14691 A1 | * 4/1998 | .................. | 415/158 |

* cited by examiner

*Primary Examiner*—Christopher Verdier
(74) *Attorney, Agent, or Firm*—Crowell & Moring LLP

(57) ABSTRACT

An exhaust-gas turbocharger turbine of an internal combustion engine is provided with a spiral guide passage arranged in a turbine housing, a turbine impeller, a flow gap be ween the guide passage and the turbine impeller, and guide blades forming a guide cascade. The guide cascade with the guide blades projects axially from a support, arranged so as to be displaceable in the axial direction in the turbine housing, in such a way that the guide blades, in normal operation, are mounted in recesses of a housing wall part of the turbine housing, the recesses, in the form of a female piece, forming a mating profile shape for the guide blades. In braking operation of the internal combustion engine, the guide blades project into the flow gap during an axial displacement of the support. The device with actuation for the braking operation can be fitted as a complete module into the turbine spiral.

11 Claims, 5 Drawing Sheets

EXHAUST GAS TURBOCHARGER TURBINE

FIELD OF THE INVENTION

The invention relates to an exhaust-gas turbocharger turbine.

BACKGROUND

An exhaust-gas turbocharger turbine of the generic type is described in DE 42 32 400 C1. In this case, an adjustable flow guide device having guide blades for controlling the exhaust-gas passage in normal operation, in particular within the part-load range of the internal combustion engine, is located in the flow gap between the guide passage and the turbine impeller. In addition, the adjustable flow guide device, which is located continuously in the flow gap, is also used for a braking operation of the internal combustion engine.

A disadvantage in this case, however, is the fact that, although better acceleration is achieved within the part-load range by the flow guide device having the guide blades, efficiency losses and consumption disadvantages occur in full-load operation.

Similar adjustable low guide devices for exhaust-gas turbines of exhaust-gas turbochargers are described in DE 43 03 520 C1 and 43 03 521 C1.

With regard to the prior art, reference is also made to EP 0 571 205 B1 and U.S. Pat. No. 4,776,168, which each describe adjustable flow guide devices for controlling the degree of charging of the exhaust-gas turbine in normal operation, in which case use in engine braking operation is also partly envisaged.

The object of the resent invention is to design an exhaust-gas turbocharger turbine in such a way that a high braking performance in braking operation of the internal combustion engine is achieved, although no efficiency losses are to occur at full load. At the same time, however, the dynamic driving behaviour of the vehicle is to be improved.

BRIEF SUMMARY

Unlike the prior art, in which a guide cascade with mostly adjustable guide blades projected continuously in normal operation into the flow gap for controlling the exhaust gas flow rate, a fixed guide cascade is now used according to the invention, this guide cascade being mounted in normal operation in recesses of a housing wall of the turbine housing. This means that the flow gap is completely free in normal operation, for which reason efficiency losses no longer have to be tolerated during full-load operation.

In an inventive manner, with the guide cascade, the supercharging potential of the exhaust-gas turbocharger is now also utilized during the engine braking operation. To this end, during braking operation, the guide cascade is pushed with an appropriate axial displacement of the support into the flow gap, in which case the guide blades can be arranged radially so as to be optimized in terms of flow in such a way hat the exhaust-gas turbine continues to run even at a low residual-gas flow. On the one hand, this supercharges the engine, whereby the gas flow on the exhaust-gas side is then consequently increased in turn, and on the other hand the exhaust-gas back pressure is thus also increased, which at the same time allows the turbine to rotate even faster.

This process is repeated until the exhaust-gas back pressure is so great that the engine speed no longer increases. The braking action of the engine and thus that of the vehicle takes place because the additional air and the additional exhaust-gas back pressure in the combustion space have a very powerful braking effect on the piston and, at the end of the compression phase, the compressed air is discharged into the exhaust system in a known manner via a valve additionally located in the cylinder head, e.g. a constant choke. In this way, the energy in the form of compressed air is not returned again to the piston.

With the solution according to the invention, a higher braking performance with simultaneous reduction in the thermal loading of engine components, in particular of injection nozzles, is achieved. At the same time, an improvement in the dynamic driving behaviour of the vehicle is thereby achieved, since the turbocharger continues to run during the braking of the engine and a charge pressure is immediately present again at the engine during a subsequent acceleration action. In this way, a so-called turbohole is avoided.

Apart from a small clearance, which is necessary for the axial displacement of the guide blades, a virtually closed housing wall, with at the same time a free flow gap, is achieved by the design of the housing wall part in the region of the guide blades in the form of a female piece in a mating profile shape for the guide blades. Thus no disturbing contours, which would impair the efficiency of the turbocharger, are located in the guide passage and the flow gap during normal turbocharger operation, i.e. in fired operation.

In an advantageous refinement of the invention, the braking device is designed as a prefabricated module and can be pushed as a unit into the turbine. In this case, at least the guide cascade with the guide blades, the support and the housing wall part, which forms the female piece, are parts of the module. Of course, further parts may if need be also be integrated and pushed as a prefabricated module into the exhaust-gas turbocharger turbine.

Advantageous refinements and developments of the invention follow from the subclaims and from the exemplary embodiments described in principle below with reference to the drawings.

DESCRIPTION OF EMBODIMENTS

Figure 1:
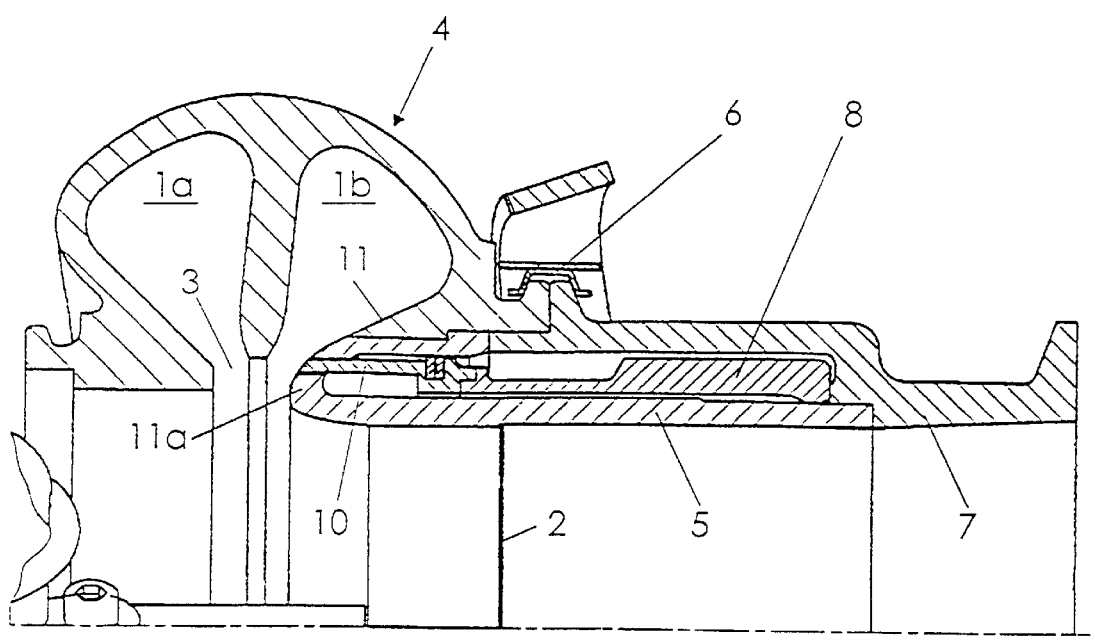
FIG. 1 shows a longitudinal section along line I—I of FIG. 2 through exhaust-gas turbocharger turbine.

An exhaust-gas turbocharger turbine of known type of construction having a double-flow spiral guide passage 1*a* and 1*b*, a turbine impeller 2, and a flow gap 3 between the guide passages 1*a* and 1*b* and the turbine impeller 2 is shown in the exemplary embodiment. An inner sleeve 5 which forms a flow guide for the exhaust gases leaving the turbine impeller 2 is located in the turbine housing 4. An exhaust-gas flange 7 is connected to the turbine housing 4 via a tightening strap 6.

Axially outside the flow gap 3, a support in the form of a sleeve 8 is arranged on the outer circumference of the inner sleeve 5 so as to be axially displaceable coaxially to the longitudinal axis of the turbine impeller 2. Projecting from that end face of the sleeve 8 which faces the flow gap 3 are guide blades 9, which form a guide cascade 10, for which purpose the guide blade 9 are arranged so as to be appropriately distributed in a ring shape over the circumference. In the pushed-back or pushed-in state of the guide blades 9, which are shown in FIG. 1, the guide-blade leading edges are flush with a housing wall part 11a of a housing wall 11 of the turbine housing 4. The housing wall part 11a may be in one piece with the inner sleeve 5.

Figure 2:
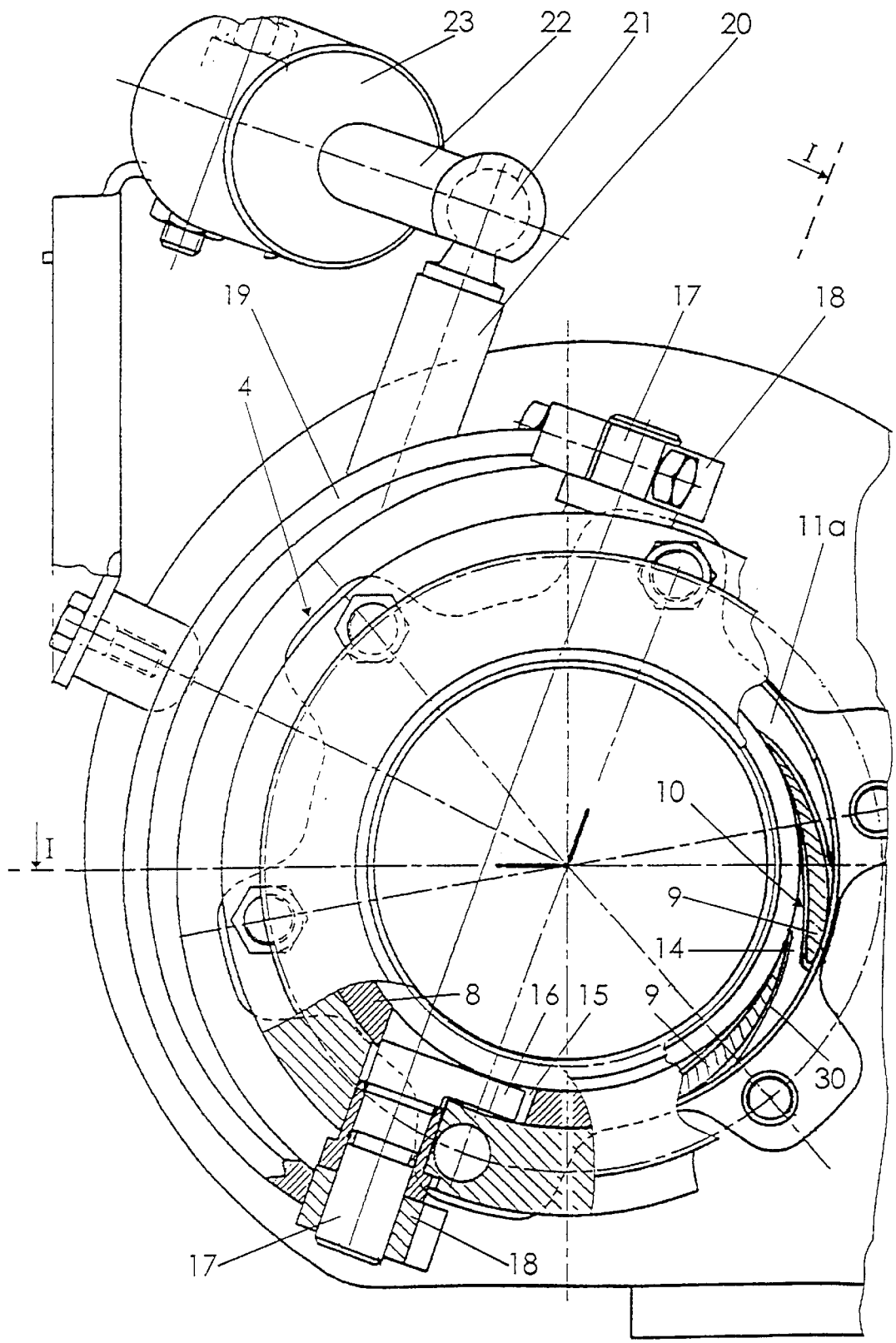
FIG. 2 shows an end view—partly in section—of the exhaust-gas turbocharger turbine.

The end view of the housing wall part 11a can be partly seen in FIG. 2, where it can be seen that the housing part 11a is provided with recesses, which form a mating profile shape for the guide blades 9. Except for a small gap 30 (see FIG. 2), this results in a virtually closed housing wall 11 or 11a. Exhaust gases passing through the gap 30 can be prevented from escaping by a sealing ring 12 on the outer circumference of he sleeve 8. If need be, a further sealing ring may additionally be provided between the outer circumferential wall of the inner sleeve 5 and the inner circumferential wall of the sleeve 8.

The position of the guide blades 9 can be seen from FIG. 2, where a flow gap 14 can be seen between the blades, this flow gap 14 serving to permit the controlled passage of exhaust gas in the extended state of the guide cascade 10, in which the guide blades 9 project into the flow gap 3 during braking operation.

All sorts of actuating devices are possible for the axial displacement of the support or the sleeve 5 for the extension of the guide blades 9 into the flow gap 3 (see representation in broken lines) and for their retraction.

The braking device described above, with its essential parts, is designed as a prefabricated module and can therefore be inserted as a unit into the turbine housing. As can be seen, this module consists of the guide cascade 10 with the guide blades 9, the support 8 connected thereto, the housing wall part 11a, which is in one piece with the inner sleeve 5, and the flange 7. This module is pushed into the exhaust-gas turbocharger turbine during assembly and connected to the turbine housing 4 via the tightening strap 6, which in each case encloses an annular flange of the turbine housing 4 and the exhaust-gas flange 7. As can be seen in particular from FIG. 1, the housing wall part 11a is adapted in its contour to the housing wall 11, in which case there are no disturbing edges in the flow passage in the pushed-in state of the guide blades 9.

Figure 3:
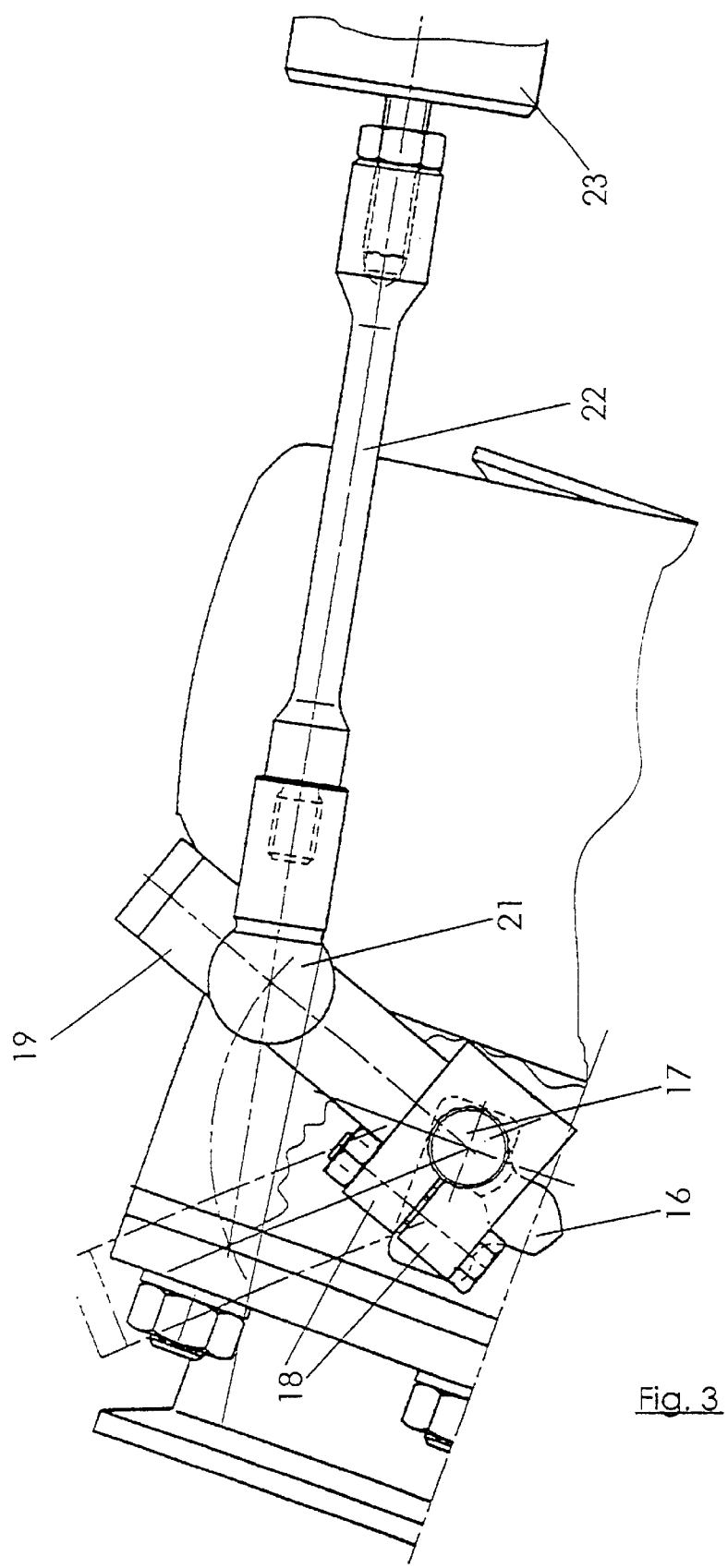
FIG. 3 shows a plan view of the exhaust-gas turbocharger turbine according to FIG. 1.

A mechanical solution is shown in principle in FIGS. 1 to 3, an axial displacement with direct introduction of force being achieved via only a few components, which operate in a reliable manner. To this end, the sleeve 8 is provided at the outer circumference with two opposite recesses 15, into which adjusting lugs 16 project in each case. The adjusting lugs 16 have an adjusting shaft 17, the adjusting shafts 17 being held an mounted between clamping jaws 18. The two opposite clamping jaws 18, in which a shaft 17 is mounted in each case, are connected to one another by a stirrup 19, which extends in a curved shape on the outside over the turbine housing 4. An adjusting lever 20 of an adjusting device acts on the stirrup 19 and can be actuated via a ball-and-socket joint 21 which is connected to a piston rod 22 of a pneumatic cylinder 23.

The two end positions for the guide cascade 10, namely the extended position and the pushed-back position, can be seen from FIG. 3. This is achieved by appropriate pivoting of the stirrup 19 via the pneumatic cylinder 23. To this end, the adjusting lugs sit in an appropriately eccentric manner on the shafts 17 connected to them in each case. By the direct engagement of the adjusting lugs 16 in the sleeve 8, the displacing force is introduced into the sleeve 8 parallel to the axis without a tilting tendency.

The shafts 17 of the adjusting lugs 16 are led outwards through the turbine housing 4. Due to the torque transmission from the stirrup 19 to the adjusting lugs 16 via the shafts 17, which also constitute the connection from the inside of the turbocharger to the outside, only two sealing-ring gaps with a correspondingly long path result, so that an escape of exhaust gas, even in the event of failure of the sealing ring 12, is largely ruled out.

Figure 4:
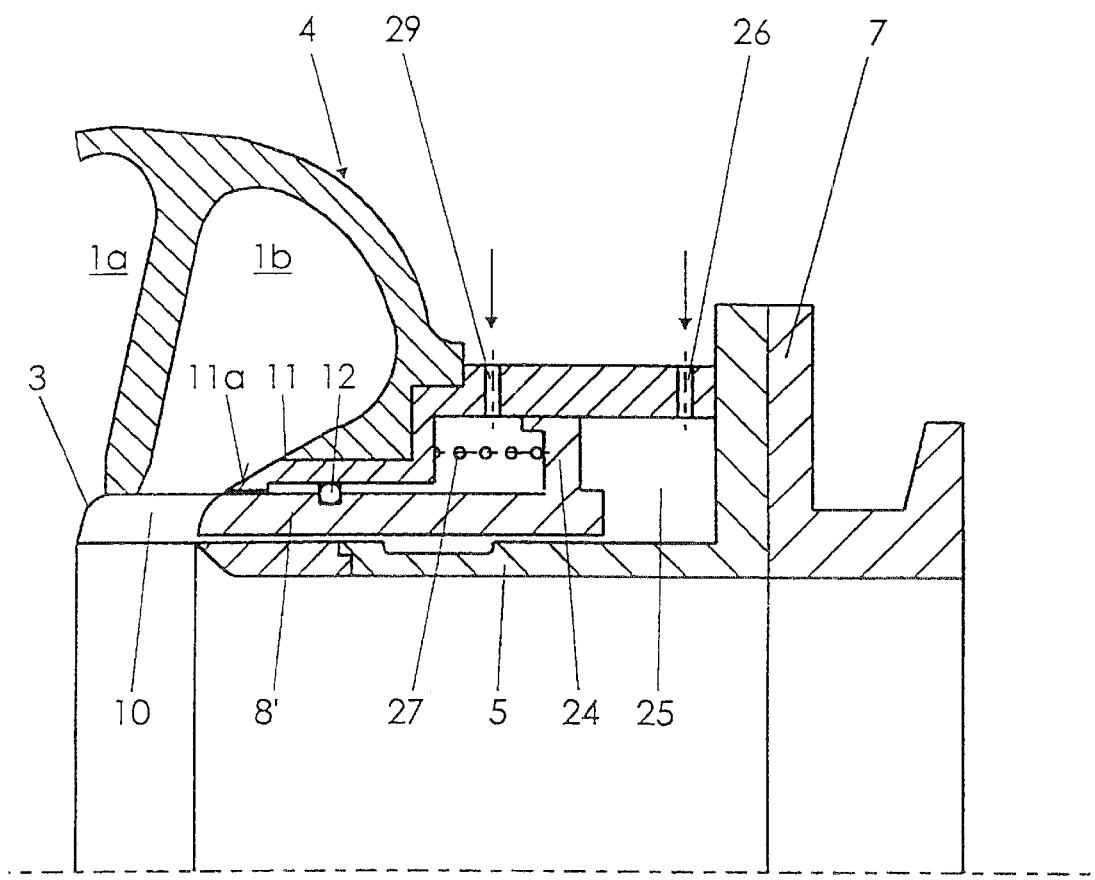
FIG. 4 shows a longitudinal section (detailed) through an exhaust-gas turbocharger turbine of a different design.
Figure 5:
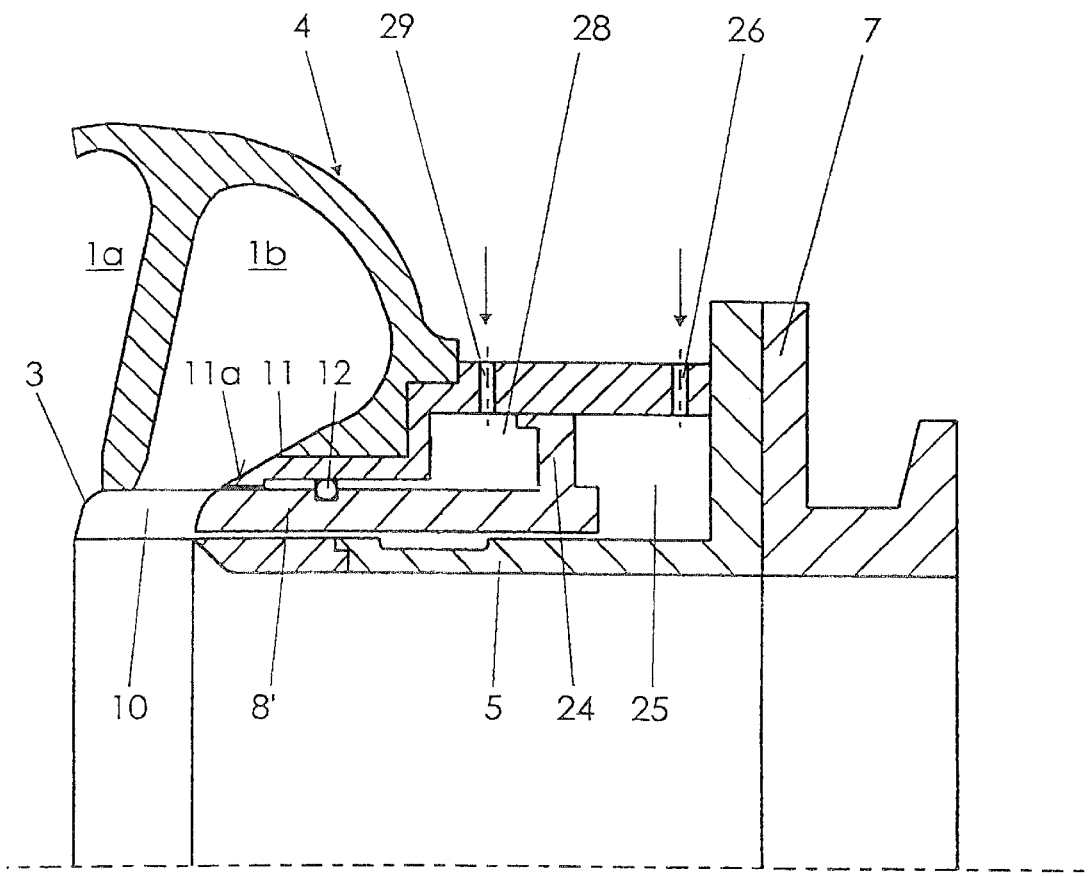
FIG. 5 shows a longitudinal section (detailed) through an exhaust-gas turbocharger turbine of a different design.

Pneumatic actuation of the sleeve 8' is shown in principle in FIGS. 4 and 5. As can be seen, the sleeve 8' is designed as an annular piston for this purpose, having an annular surface 24 at the rear end, i.e. that end of the sleeve 8' which is remote from the flow gap 3, this annular surface 24 forming a piston surface. A piston space 25 with a compressed-air feed 26 is located behind the annular surface 24. If compressed air is fed via the compressed-air feed 26, which is generally effected from the vehicle distribution system, the sleeve 8' is displaced axially in the direction of the flow gap 3, whereby the guide blades 9 of the guide cascade 10 are correspondingly pushed into the gap space 3, although this is only the case during braking operation of the engine.

To reset the guide blade 10, a spring 27 acts on that side of the annular surface 24 which is opposite the piston space 25, the spring 27 being supported with its other end on the turbine housing 4.

Instead of the spring 27, a further piston space 28, which likewise acts on the annular surface 24 and which also has a compressed-air feed 29, may also be located at this point.

The solution with the spring 27 and the solution with the piston space 28 and the compressed-air feed 29 are depicted in FIGS. 4 and 5, respectively. However, both solutions must of course be provided only as alternatives.

The arrangement of a spring 27 has the advantage that it is preloaded when the guide cascade 10 is pushed into the flow gap 3, whereby end-position damping is achieved.

Admission of compressed air has the advantage that lower actuating forces are required, although in this case end-position damping devices should generally be provided. Compared with the mechanical solution or a mechanical/pneumatic solution, a pneumatic solution has the further advantage that fewer components are required in this case and the device occupies less space.

In order to obtain a prefabricated module for the braking device, a housing wall part 11a is separated from the turbine housing 4 just as in the exemplary embodiment according to FIGS. 1 to 3 and is designed as a female piece but forms a continuous transition to the housing wall 11. The housing wall part 11a is connected to the inner sleeve 5 in a manner not shown in any more detail. Just as in the exemplary embodiment according to FIGS. 1 to 3, the housing wall part 11a is provided with an axial outer wall part which is directed towards the exhaust-gas flange 7 and forms a guide for the support or the sleeve 8'.

In this way, as can be seen from FIG. 4, the guide cascade 10 with the guide blades 9, the inner sleeve 5, the sleeve 8' and the housing parts surrounding the piston space 25, and if need be also the exhaust-gas flange 7 may again form module which is prefabricated and can be pushed as a unit into the exhaust-gas turbocharger turbine.

Although the invention has been described in detail with reference to certain preferred embodiments and specific examples, variations and modification exist within the scope and spirit of the invention as described and as defined in the following claims.

What is claimed is:

1. An exhaust-gas turbocharger turbine of an internal combustion engine, having:

a spiral guide passage arranged in a turbine housing, a turbine impeller, a flow gap between the guide passage and the turbine impeller, and guide blades forming a guide cascade, wherein the guide cascade with the guide blades projects axially from a support, arranged so as to be displaceable in the axial direction in the turbine housing, in such a way that the guide blades, in normal operation, are mounted in recesses of a housing wall part of the turbine housing, the recesses, in the form of a female piece, forming a mating profile shape for the guide blades, and wherein in braking operation of the internal combustion engine, the guide blades project into the flow gap for forming a braking device during an axial displacement of the support.

2. The exhaust-gas turbocharger turbine according to claim 1, wherein the support is designed as a sleeve which lies coaxially to the longitudinal axis of the turbine wheel.

3. The exhaust-gas turbocharger turbine according to claim 2, wherein the sleeve is provided with a sealing ring on an outer circumferential wall.

4. The exhaust-gas turbocharger turbine according to claim 1, wherein the support or a sleeve is provided with an actuating device for axial displacement, and adjusting members engage in said actuating device.

5. The exhaust-gas turbocharger turbine according to claim 4, wherein the actuating device has at least two opposite recesses in the support or the sleeve, in which recesses adjusting lugs project, which are connected to one another via a stirrup, on which an adjusting device acts.

6. The exhaust-gas turbocharger turbine according to claim 1, wherein the support or a sleeve is provided with a hydraulic or pneumatic actuating device.

7. The exhaust-gas turbocharger turbine according to claim 6, wherein the sleeve is designed as a piston, a piston space being located on a side of the sleeve which is remote from the flow gap.

8. The exhaust-gas turbocharger turbine according to claim 6, wherein to reset the sleeve, a spring device acts on the sleeve.

9. The exhaust-gas turbocharger turbine according to claim 6, wherein to reset the sleeve, a hydraulic or pneumatic resetting device is provided.

10. The exhaust-gas turbocharger turbine according to claim 7, wherein the sleeve is provided with a second piston space, which is located between the flow gap and the piston space which is located on said side of the sleeve which is remote from the flow gap.

11. The exhaust-gas turbocharger turbine according to claim 1, wherein the braking device, designed as a prefabricated module, can be pushed into the turbine, in which case at least the guide cascade with the guide blades, the support and the housing wall part, which forms the female piece, are parts of the module.

* * * * *